(12) United States Patent
Grundvig et al.

(10) Patent No.: US 7,929,237 B2
(45) Date of Patent: Apr. 19, 2011

(54) MODULATED DISK LOCK CLOCK AND METHODS FOR USING SUCH

(75) Inventors: Jeffrey P. Grundvig, Loveland, CO (US); Richard Rauschmayer, Longmont, CO (US)

(73) Assignee: Agere Systems Inc., Allentown, PA (US)

( * ) Notice: Subject to any disclaimer, the term of this patent is extended or adjusted under 35 U.S.C. 154(b) by 229 days.

(21) Appl. No.: 12/147,543

(22) Filed: Jun. 27, 2008

(65) Prior Publication Data

US 2009/0323214 A1    Dec. 31, 2009

(51) Int. Cl.
G11B 5/09 (2006.01)
G11B 27/36 (2006.01)

(52) U.S. Cl. .......................... 360/51; 360/31

(58) Field of Classification Search ............. 360/39, 360/51
See application file for complete search history.

(56) References Cited

U.S. PATENT DOCUMENTS

| | | |
|---|---|---|
| 5,377,058 A | 12/1994 | Good et al. |
| 5,521,948 A | 5/1996 | Takeuchi |
| 5,668,679 A | 9/1997 | Swearingen et al. |
| 5,696,639 A | 12/1997 | Spurbeck et al. |
| 5,835,295 A | 11/1998 | Behrens |
| 5,986,830 A | 11/1999 | Hein |
| 5,987,562 A | 11/1999 | Glover |
| 6,023,383 A | 2/2000 | Glover et al. |
| 6,111,712 A | 8/2000 | Vishakhadatta et al. |
| 6,208,478 B1 | 3/2001 | Chiu et al. |
| 6,400,518 B1 | 6/2002 | Bhaumik et al. |
| 6,404,829 B1 | 6/2002 | Sonu |
| 6,530,060 B1 | 3/2003 | Vis et al. |
| 6,633,447 B2 | 10/2003 | Franck et al. |
| 6,657,802 B1 | 12/2003 | Ashlet et al. |
| 6,775,529 B1 | 8/2004 | Roo |
| 6,788,484 B2 | 9/2004 | Honma |
| 6,816,328 B2 | 11/2004 | Rae |
| 6,856,183 B2 * | 2/2005 | Annampedu .............. 327/159 |
| 7,082,005 B2 | 7/2006 | Annampedu et al. |
| 7,092,462 B2 | 8/2006 | Annampedu et al. |
| 7,116,504 B1 | 10/2006 | Matsoberg |
| 7,154,689 B1 | 12/2006 | Shepherd et al. |
| 7,167,328 B2 | 1/2007 | Annampedu et al. |
| 7,187,739 B2 | 3/2007 | Ma |
| 7,193,798 B2 | 3/2007 | Byrd et al. |
| 7,203,013 B1 | 4/2007 | Han et al. |
| 7,230,789 B1 | 6/2007 | Brunett et al. |
| 7,301,717 B1 | 11/2007 | Lee et al. |
| 7,308,057 B1 | 12/2007 | Patapoutian |
| 7,323,916 B1 * | 1/2008 | Sidiropoulos et al. ........ 327/156 |

(Continued)

OTHER PUBLICATIONS

Aziz and Annampedu, "Asynchronous Maximum Likelihood (ML) Detection of Servo repeatable Run Out (RRO) Data", May 2006 IEEE Int. Mag Con.

*Primary Examiner* — Daniell L Negrón
*Assistant Examiner* — Regina N Holder
(74) *Attorney, Agent, or Firm* — Hamilton, DeSanctis & Cha (57) ABSTRACT

Various embodiments of the present invention provide systems and methods for controlling access to a magnetic storage medium. As one example, a method for controlling access to a storage medium is disclosed that includes calculating a point to point error amount, and generating a incremental error value based at least in part on the point to point error amount. The incremental error value is applied incrementally across a defined number of clock cycles.

21 Claims, 5 Drawing Sheets

U.S. PATENT DOCUMENTS

| | | |
|---|---|---|
| 7,375,918 B1 | 5/2008 | Shepherd et al. |
| 7,499,238 B2 | 3/2009 | Annampedu |
| 7,620,101 B1 | 11/2009 | Jenkins |
| 2002/0181377 A1 | 12/2002 | Nagata et al. |
| 2005/0046982 A1 | 3/2005 | Liu et al. |
| 2006/0023602 A1* | 2/2006 | Rauschmayers ........... 369/59.19 |
| 2007/0104300 A1 | 5/2007 | Esumi et al. |
| 2007/0247736 A1* | 10/2007 | Sai et al. ................. 360/51 |
| 2007/0263311 A1 | 11/2007 | Smith |
| 2008/0212715 A1 | 9/2008 | Chang |
| 2008/0266693 A1 | 10/2008 | Bliss et al. |
| 2009/0002862 A1 | 1/2009 | Park |
| 2009/0142620 A1 | 6/2009 | Yamamoto et al. |

* cited by examiner

MODULATED DISK LOCK CLOCK AND METHODS FOR USING SUCH

BACKGROUND OF THE INVENTION

The present invention is related to systems and methods for accessing a magnetic storage medium, and more particularly to systems and methods for controlling access to a magnetic storage medium.

Figure 1A:
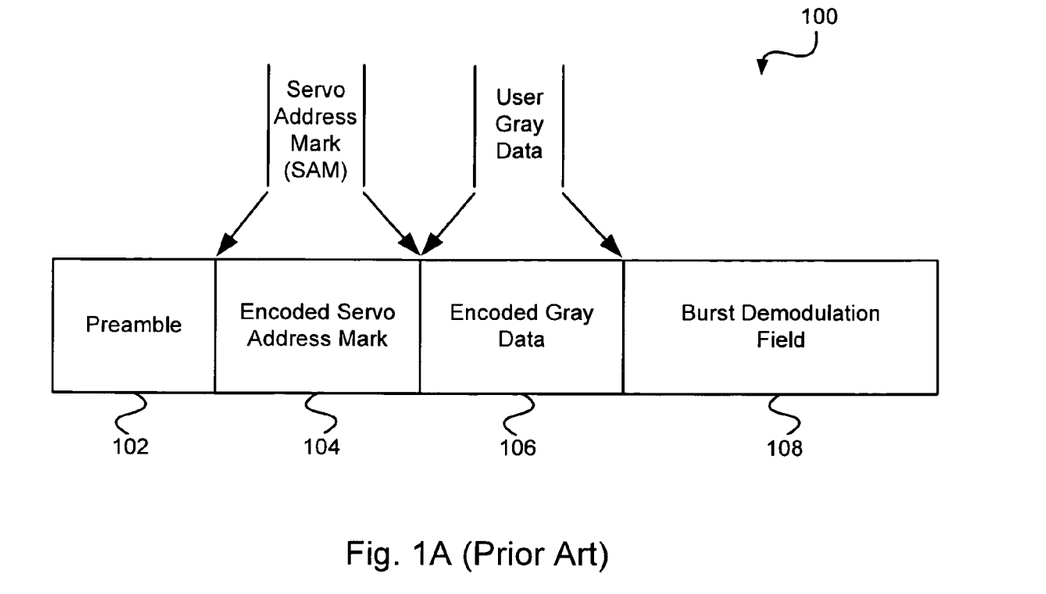
FIGS. 1A, 1B and 1C show prior art approaches to disk lock clock synchronization.
Figure 1B:
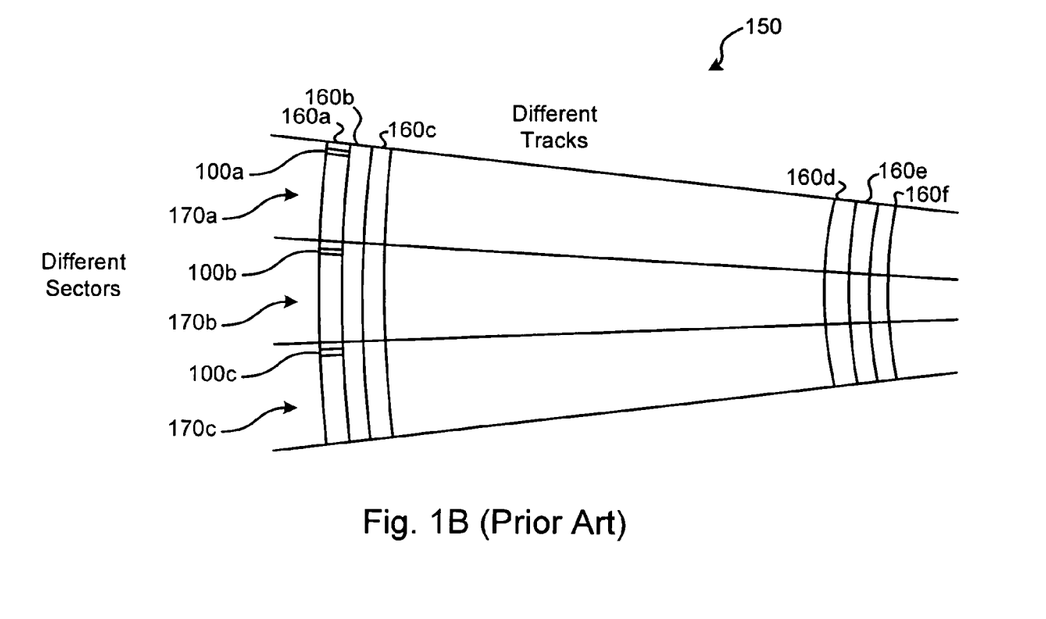

A magnetic storage device typically include a storage medium that carries both stored data and synchronization information. The synchronization information is placed at intermittent locations across the storage medium and is periodically accessed to aid in identifying the location of a read/write head assembly in relation to the storage medium. FIG. 1A depicts an exemplary set of synchronization information generally referred to as a servo data sector 100. As shown, servo data sector 100 may include a preamble pattern 102 which allows the system to recover the timing and gain of the written servo data. Preamble pattern 102 is typically followed by a servo address mark (SAM) 104 which is the same for all servo sectors. SAM 104 is then followed by encoded servo Gray data 106, and Gray data 106 is followed by one or more burst demodulation fields 108. Gray data 106 may represent the track number/cylinder information and provides coarse positioning information for a read head traversing a magnetic storage medium. Burst demodulation field 108 provides fine positioning information for the read head traversing a magnetic storage medium. FIG. 1B shows the aforementioned servo data sector 100 incorporated as part of data sectors 170 distributed across a number of tracks 160 that extend in a radial pattern around a magnetic storage medium 150.

In an ideal case, a read/write head assembly traverses an individual track over alternating servo data sectors and user data sectors. As the read/write head assembly traverses the servo data sectors 100, a SAMFOUND signal is generated providing an indication of the location of the read/write head assembly in relation to magnetic storage medium 150. When a SAMFOUND signal is generated, the time interval from the last SAMFOUND signal is used to determine whether a disk lock clock is synchronized to the placement of servo data sectors 100 on storage medium 150. Where the disk lock clock is not properly locked, it is increased or decreased by an error amount indicated by the difference between the expected timing between consecutive SAMFOUND signals and the actual timing. This clock adjustment is performed once for each servo data sector 100.

Because adjustment of the disk lock clock is performed once per servo data sector with a step frequency change imposed to correct any error, the best that such an approach can achieve is to reduce the frequency offset of any given bit within the user data by one-half of the identified error. In the past, such an approach has been adequate to format overhead and to generally allow for system operation. However, as data detector technology continues to improve which allows for operation at lower signal to noise ratios, the loss of lock performance are becoming increasingly difficult to meet.

Hence, for at least the aforementioned reasons, there exists a need in the art for advanced systems and methods for accessing a magnetic storage medium.

BRIEF SUMMARY OF THE INVENTION

The present invention is related to systems and methods for accessing a magnetic storage medium, and more particularly to systems and methods for controlling access to a magnetic storage medium.

Various embodiments of the present invention provide methods for controlling access to a storage medium. Such methods include calculating a point to point error amount, and generating a incremental error value based at least in part on the point to point error amount. The incremental error value is applied incrementally across a defined number of clock cycles. In some instances of the aforementioned embodiments, the point to point error amount is a SAM to SAM error amount extending from a first SAMFOUND signal in one sector to a second SAMFOUND signal in a later sector. In one or more instances of the aforementioned embodiments, the defined number of clock cycles is approximately equivalent to the number of clock cycles expected between a first SAMFOUND signal and a second SAMFOUND signal. In other instances of the aforementioned embodiments, the defined number of clock cycles is substantially less than the number of clock cycles expected between a first SAMFOUND signal and a second SAMFOUND signal.

Incrementally applying the incremental error value may include decrementing an accumulated error feedback value by the incremental error value for each of the defined number of clock cycles, or may include incrementing the accumulated error feedback value by the incremental error value for each of the defined number of clock cycles. In some cases, generating the incremental error value includes dividing the point to point error amount by an expected point to point error amount to create a percentage error amount, and dividing the percentage error amount by the defined number of clock cycles to create the incremental error value. Various instances of the aforementioned embodiments further include multiplying a reference clock by a variable multiplicand to generate a master clock. In such cases, the variable multiplicand is varied based at least in part on the incremental application of the incremental error value across a defined number of clock cycles. In some cases, the defined number of clock cycles is a defined number of cycles of the master clock.

Other embodiments of the present invention provide ramped disk lock clock feedback circuits. Such circuits include an error calculation circuit and a smooth feedback application circuit. The error calculation circuit calculates an incremental error value based upon a point to point error amount determined from accessing a storage medium, and the smooth feedback application circuit receives the incremental error value and applies the incremental error value a across defined number of clock cycles and provides the result as an error feedback signal. In some instances of the aforementioned embodiments, the circuits further include a SAM to SAM error determination circuit. In such instances, the point to point error amount is a SAM to SAM error amount extending from a first SAMFOUND signal in one sector to a second SAMFOUND signal in a later sector determined by the SAM to SAM error determination circuit. In various instances of the aforementioned embodiments, the error calculation circuit includes a first divider circuit that divides the SAM to SAM error amount by an expected SAM to SAM period, and a second divider circuit that divides the result of dividing the SAM to SAM error amount by the expected SAM to SAM period by the defined number of clock cycles. In particular instances, the smooth feedback application circuit includes an accumulator that either increments or decrements the error feedback signal by the incremental error value once per cycle for the defined number of clock cycles. In various instances of the aforementioned embodiments, the circuits further include a multiplier circuit that receives a reference clock and the error feedback signal. The multiplier circuit multiplies the reference clock by a variable multiplicand to generate a master clock. The variable multiplicand is varied based at least in part on the error feedback signal.

Yet other embodiments of the present invention provide storage systems that include a storage medium and a medium controller. The storage medium includes a number of data bits and moves at a movement rate. The medium controller generates a master clock correlated to the movement rate. The medium controller includes an error calculation circuit, a smooth feedback application circuit, and a multiplier circuit. The error calculation circuit calculates an incremental error value based upon a point to point error amount determined from accessing a storage medium, and the smooth feedback application circuit receives the incremental error value and applies the incremental error value a across defined number of clock cycles and provides the result as an error feedback signal. The multiplier circuit receives a reference clock and the error feedback signal, wherein the multiplier circuit multiplies the reference clock by a variable multiplicand to generate a master clock. The variable multiplicand is varied based at least in part on the error feedback signal. The storage system further includes a sampling device that samples the data bits at a rate corresponding to the master clock.

Yet other embodiments of the present invention provide methods for controlling access to a storage medium. Such methods include predicting a point to point error amount for a succeeding wedge, and generating a incremental error value based at least in part on the predicted point to point error amount. The incremental error value is incrementally applied across a defined number of clock cycles corresponding to the succeeding wedge.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to systems and methods for accessing a magnetic storage medium, and more particularly to systems and methods for controlling access to a magnetic storage medium.

Figure 1C:
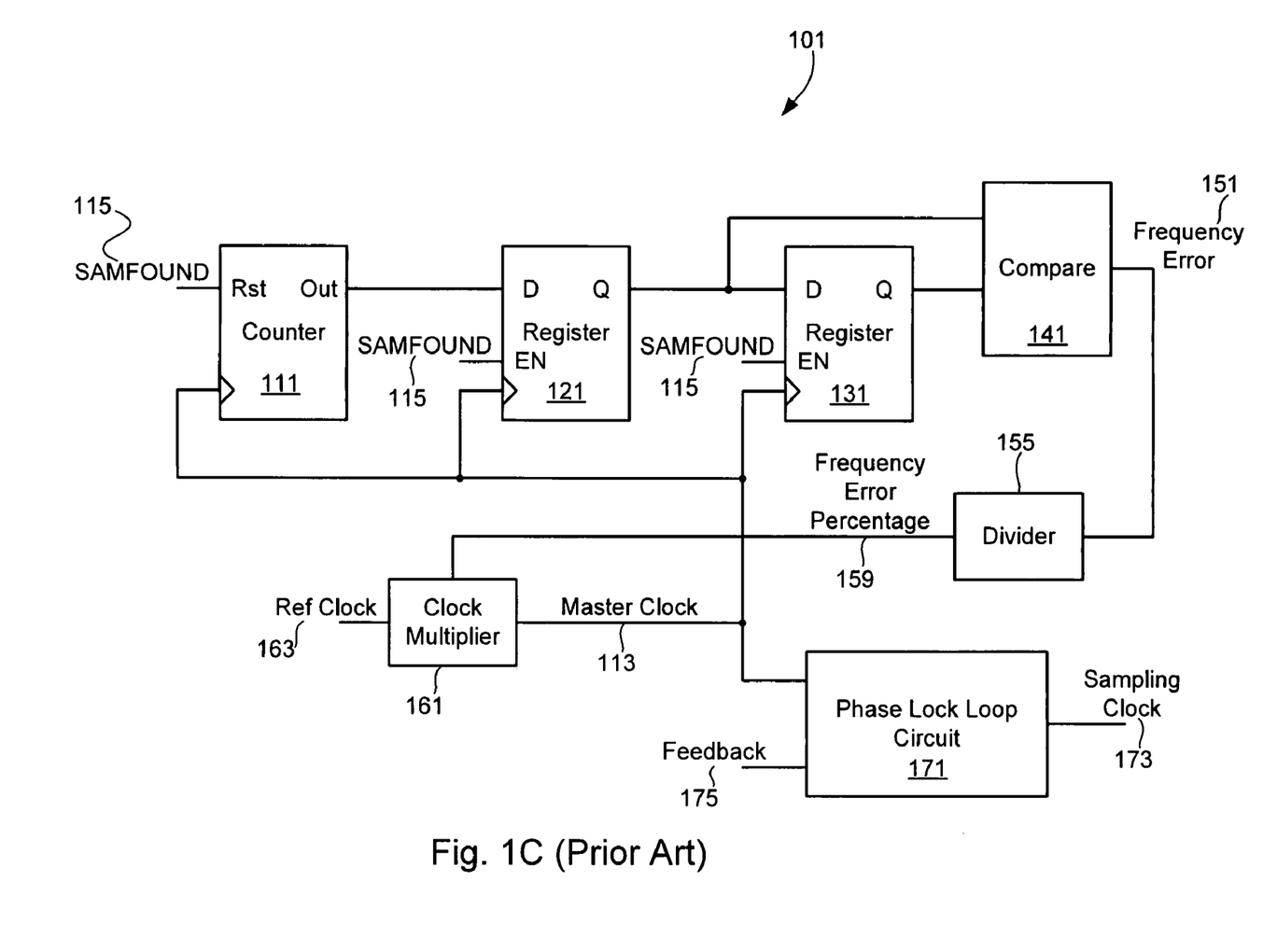

Turning to FIG. 1C, a prior art disk lock clock circuit 101 is shown. Disk lock clock circuit 101 includes a counter that is incremented on each rising edge of a master clock 113, and is reset each time a SAMFOUND signal 115 is asserted. In addition, each time SAMFOUND signal 115 is asserted, the count value from counter 111 is stored to a register 121 and the value previously stored in register 121 is stored in a register 131. Thus, register 131 holds a count value associated with the preceding SAMFOUND signal 115, and register 121 holds a count value for the current SAMFOUND signal 115. The count from each of registers, 131 are compared by a comparator 141. The output of comparator 141 is a frequency error output 151 that indicates whether the count between successive SAMFOUND signals 115 is increasing or decreasing. Where it is increasing or decreasing, the value of frequency error output 151 is non-zero. Frequency error output 151 is provided to a divider circuit 155 that divides it by an SAM to SAM count value to yield a frequency error percentage output 159.

A clock multiplier circuit 161 receives a reference clock 163 and multiplies it by a defined multiplicand to yield master clock 113. The defined multiplicand can be adjusted up or down depending upon frequency error percentage output 159 that is provided to clock multiplier circuit 161. This effectively operates as a feedback to adjust the rate of master clock 113 based on any error determined from one SAMFOUND signal 115 to the next. Master clock 113 is used to drive a phase lock loop circuit 171 that generates a sampling clock 173 that is used to sample each individual bit as it is retrieved from a storage medium. As is know in the art, phase lock loop circuit 171 is adjustable based on a feedback signal 175 that may be generated using frequency information derived from a preamble portion of the sector data.

The disk locking mechanism discussed above in relation to FIG. 1C operates to modify the rate of master clock 113 up one down once for every sector based on a determined SAM to SAM timing difference. This results in application of a step change in frequency which on average only reduces the frequency offset of any given bit within the user data by one-half of the identified frequency error percentage. It should be noted that the aforementioned approach for SAM to SAM timing determination is one of many such approaches that are known in the art for applying a step function to correct a frequency error in the disk lock clock mechanism of a hard disk drive system. A variety of other approaches are also know that utilize SAM to SAM timing to define an error, and based on the error a step change in the frequency of the master clock is effectuated.

It is desirable to minimize the frequency offset between a magnetic waveform being read from a spinning disk relative to a sampling clock being used to sample data from the disk. Various embodiments of the present invention provides systems, circuits and methods for minimize or eliminate frequency error offset on an individual bit basis, rather than the sector to sector basis of the existing art. In some embodiments of the present invention, such minimization of frequency error offset on an individual bit basis is operable to improve loss of lock performance. In various embodiments of the present invention, new media types beyond traditional magnetic storage media may be enable where such new media types rely on phase coherence in reading and writing of user data on a storage medium. In one or more embodiments of the present invention, a determined error is corrected across the span of a data sector rather than all at once in a step function. Such an approach achieves one or more of the foregoing advantages and may also reduce any transients related to application of a one time frequency correction. In some cases, application of a determined error across the span of a data sector is achieved through use of a hardware ramping accumulator which controls the application of an error feedback signal such that a minimum incremental error feedback is applied during an number of bit periods extending across a data sector. This allows for a frequency error to be adjusted smoothly across a defined period, and for the sampling clock to continuously adjust to match the adjustment in the disk lock clock.

Figure 2A:
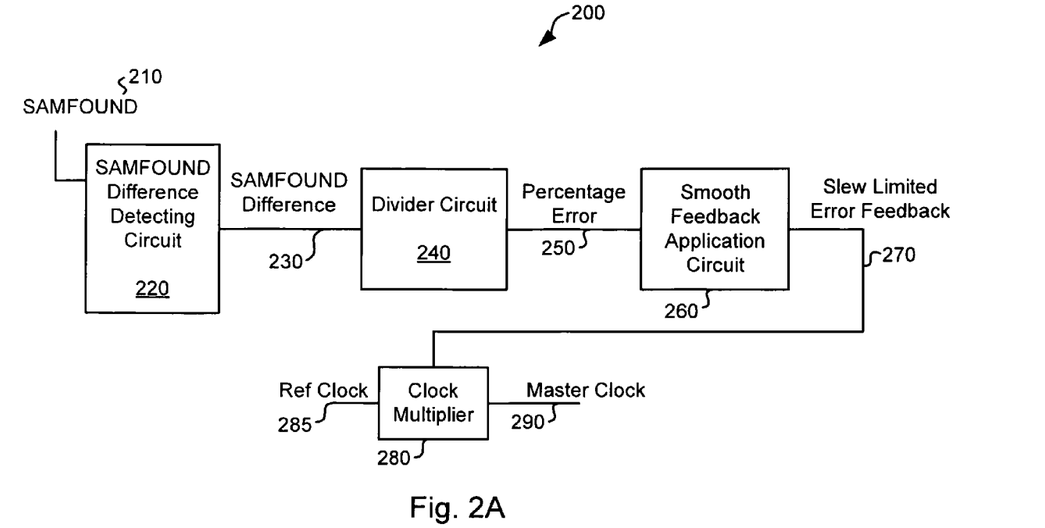
FIGS. 2A and 2B depict a continuous disk lock clock adjustment system in accordance with some embodiments of the present invention.

Turning to FIG. 2A, a continuous disk lock clock adjustment system 200 is depicted in accordance with some embodiments of the present invention. Continuous disk lock clock adjustment system 200 includes a SAMFOUND difference detecting circuit 220. SAMFOUND difference detecting circuit 220 provides a SAMFOUND difference output 230. SAMFOUND difference output 230 represents an amount of mismatch between a master clock 290 and the spin rate of a storage medium from which data is being retrieved. SAMFOUND difference detecting circuit 200 may be any circuit known in the art that is capable of determining a time difference between the occurrence of a SAMFOUND signal between different sectors. Alternatively, SAMFOUND difference detecting circuit 200 may be any circuit known in the art that is capable of determining a difference between the time between the occurrence of a SAMFOUND signal in one sector and a SAMFOUND signal in another sector and an expected SAM to SAM time period. Based on the disclosure provided herein, one of ordinary skill in the art will recognize a variety of circuits that may be implemented to provide SAMFOUND difference output 230.

SAMFOUND difference output 230 is provided to a divider circuit 240 that divides the SAMFOUND difference output by an expected number of counts between a SAMFOUND signal in one sector to a SAMFOUND signal in a subsequent sector. The divided value is provided as a percentage error output 250. Thus, as an example, where the expected number of SAM to SAM counts is one thousand and SAMFOUND difference output 230 is negative ten, then percentage error output 250 indicates a negative one percent error. As another example, where the expected number of SAM to SAM counts is five hundred and SAMFOUND difference output 230 is positive six, then percentage error output 250 indicates a positive 1.2 percent error. In some cases, this division is performed by a hardware divider. In other cases, the division is performed using a general purpose processor executing firmware or software instructions. Based upon the disclosure provided herein, one of ordinary skill in the art will recognize a variety of divider circuits that may be used in relation to different embodiments of the present invention.

Percentage error output 250 is provided to a smooth feedback application circuit 260 that provides a slew limited error feedback signal 270 to a clock multiplier circuit 280. Clock multiplier circuit 280 multiplies a reference clock 285 by a multiplicand to generate a master clock 290. The multiplicand is adjusted by an amount corresponding to slew limited error feedback signal 270. As master clock 290 is used by SAMFOUND difference detecting circuit 220 to generate SAMFOUND difference output 230, slew limited error feedback signal 270 operates as a feedback to adjust master clock 290. Clock multiplier circuit 280 may be any circuit capable of receiving a reference clock at one frequency and producing a master clock at another frequency, where the frequency of the master clock is correlated to that of the reference clock by an adjustable multiplicand. Based on the disclosure provided herein, one of ordinary skill in the art will recognize a variety of circuits that may be used to implement clock multiplier circuit 280 in accordance with different embodiments of the present invention.

Smooth feedback application circuit 260 is operable to apply percentage error output 250 incrementally across a defined time period in accordance with the following general equation:

$$\text{Incremental Modification} = \frac{\text{Percent Error}}{\text{Number of Clock Cycles in Modification Period}}.$$

In some embodiments of the present invention, the number of clock cycles in the modification period corresponds to the number of cycles of master clock 290 between assertion of the SAMFOUND signal in one sector and the assertion of the SAMFOUND signal in a subsequent sector. As an example, where the SAM to SAM period is expected to be one thousand cycles of master clock 290 and percentage error output 250 indicates a positive one percent error, smooth feedback application circuit 260 increases slew limited error feedback signal 270 by one thousandth of one percent for each cycle of master clock 290.

Alternatively, the rate may be modified such that the percent error is more rapidly applied or applied less rapidly. For example, it may be desired to apply percentage error output 250 across half of the SAM to SAM period. In such a case, slew limited error feedback 270 is incrementally increased across half of the SAM to SAM period, and not increased during the other half of the period. In this case, the number of clock cycles in the modification period is half that occurring during a SAM to SAM period. As a more particular example, where the SAM to SAM period is expected to be one thousand cycles of master clock 290 and percentage error output 250 indicates a positive one percent error, smooth feedback application circuit 260 increases slew limited error feedback signal 270 by two thousandth of one percent for one half of the cycles of master clock 290 and does not adjust slew limited error feedback signal 270 for the remaining cycles of master clock 290. Based on the disclosure provided herein, one of ordinary skill in the art will recognize a variety of slew rate limited error feedback signals that may be generated in accordance with different embodiments of the present invention.

Figure 2B:
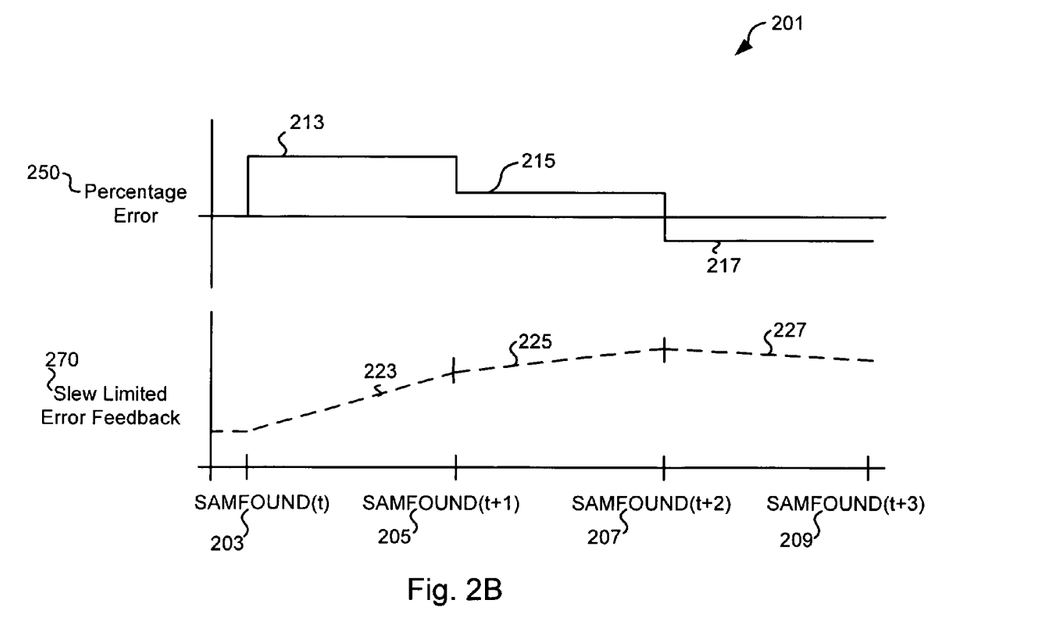

Turning to FIG. 2B, a timing diagram 201 depicts an exemplary operation of continuous disk lock clock adjustment system 200 where percentage error output 250 is applied evenly across the entire SAM to SAM period. Based on the disclosure provided herein, one of ordinary skill in the art will recognize a variety of other exemplary operations that are possible where percentage error output 250 is applied across only a portion of the SAM to SAM period. As shown, before a time 203 (i.e., before SAMFOUND(t)) percentage error output 250 is zero. During this period, slew limited error feedback signal 270 remains constant. In such a condition, the frequency of the multiplicand used to generate master clock 290 remains constant, and therefore the frequency of master clock 290 remains constant.

At a time 203, a value 213 of percentage error output 250 is registered. This value is incrementally applied across the entire period from time 203 until the next SAMFOUND signal is received at a time 205. This results in a ramping error feedback 223 where the error feedback initially applied is small, but increases over the period to be approximately equivalent to the total value 213. As value 213 is positive, ramping error feedback 223 exhibits a positive slope. At a time 205, a value 215 of percentage error output 250 is registered. This value is incrementally applied across the entire period from time 205 until the next SAMFOUND signal is received at a time 207. This results in a ramping error feedback 225 where the error feedback initially applied is small, but increases over the period to be approximately equivalent to the total value 215. As value 215 is positive, ramping error feedback 225 exhibits a positive slope. Finally, at a time 207, a value 217 of percentage error output 250 is registered. This value is incrementally applied across the entire period from time 207 until the next SAMFOUND signal is received at a time 209. This results in a ramping error feedback 227 where the error feedback initially applied is small, but increases in magnitude over the period to be approximately equivalent to the total value 217. As value 217 is negative, ramping error feedback 227 exhibits a negative slope.

Figure 3:
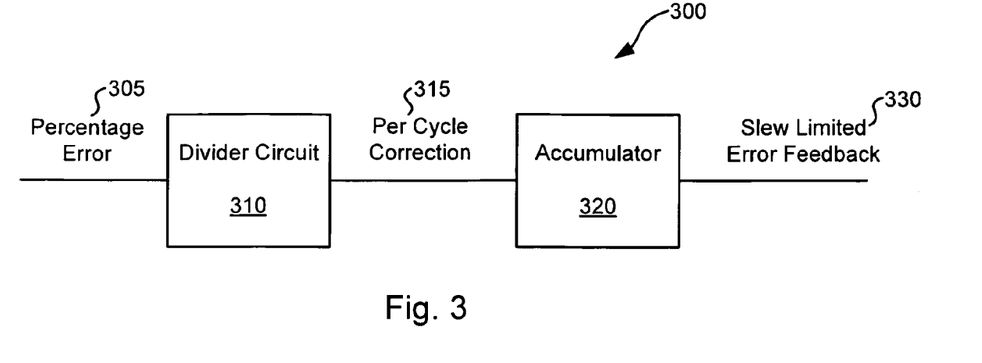
FIG. 3 depicts a smooth feedback application circuit that may be used in relation to various embodiments of the present invention.

Turning to FIG. 3, a smooth feedback application circuit 300 is depicted in relation to one or more embodiments of the present invention. Smooth feedback application circuit 300 is operable to apply percentage error output 250 incrementally across a defined time period in accordance with the following general equation:

$$\text{Incremental Modification} = \frac{\text{Percent Error}}{\text{Number of Clock Cycles in Modification Period}}.$$

Thus, smooth feedback application circuit 300 may be used in place of smooth feedback application circuit of FIG. 2A. Based on the disclosure provided herein, one of ordinary skill in the art will recognize variety of circuits that may be used ion relation to different embodiments of the present invention to apply a percentage error output incrementally across a defined time period.

Smooth feedback application circuit 300 receives a percentage error signal 305. Percentage error signal 305 is a frequency error feedback value divided by an expected number of SAM to SAM clock cycles (i.e., an expected number of counts between a SAMFOUND signal in one sector to a SAMFOUND signal in a subsequent sector). A divider circuit 310 receives percentage error signal 305 and divides it by the expected number of SAM to SAM clock cycles resulting in a per cycle correction value 315. Divider circuit 310 may be any circuit that is capable of receiving an input value and providing an output corresponding to the input divided by a dividend. In some cases, this division is performed by a hardware divider. In other cases, the division is performed using a general purpose processor executing firmware or software instructions. Based upon the disclosure provided herein, one of ordinary skill in the art will recognize a variety of divider circuits that may be used in relation to different embodiments of the present invention. Per cycle correction value 315 represents an incremental change (either positive or negative) in an error feedback signal. An accumulator 320 is used to generate a slew limited error feedback signal 330 based on per cycle correction value 315. In particular, for each cycle of a master clock (not shown), per cycle correction value 315 is added to a previously calculated error feedback value by accumulator 320. The re-calculated error feedback value is provided as slew limited error feedback signal 330. Over time, slew limited error feedback signal 330 exhibits a ramped output value that is continuously increased or decreased over a time period. This results in a reduced step change in an error correction signal when compared with prior art disk lock clock implementations. In some cases, accumulator 320 is a hardware accumulator. In other cases, accumulator 320 is implemented in a general purpose processor executing firmware or software instructions. Based upon the disclosure provided herein, one of ordinary skill in the art will recognize a variety of accumulator circuits that may be used in relation to different embodiments of the present invention.

Figure 4:
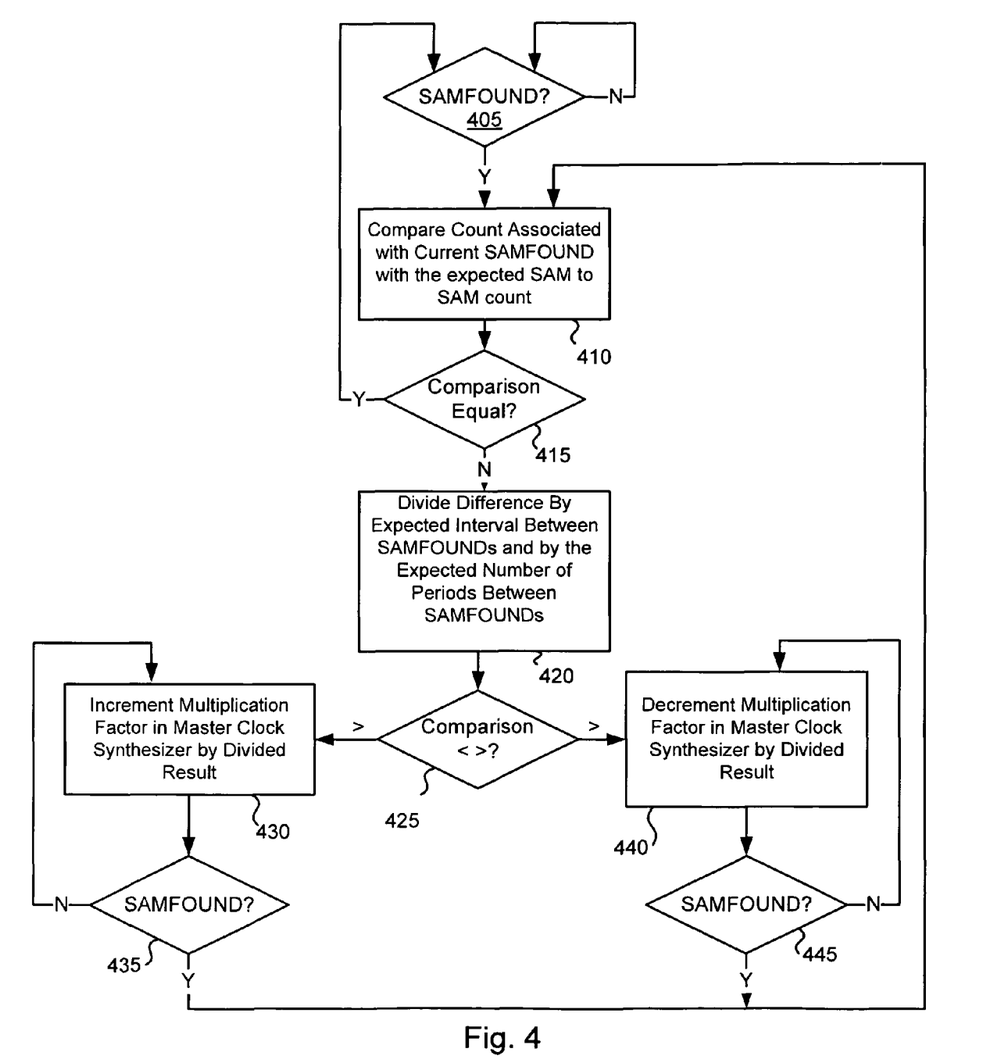
FIG. 4 is a flow diagram depicting a method for continuous disk lock clock correction in accordance with some embodiments of the present invention.

Turning to FIG. 4, a flow diagram 400 depicts a method for continuous disk lock clock correction in accordance with some embodiments of the present invention. Following flow diagram 400, is it determined whether a SAMFOUND signal is received (block 405). Where a SAMFOUND signal is received (block 405), a count between the preceding two SAMFOUND signals is compared with an expected SAM to SAM count value (block 410). It is then determined whether the count between the preceding two SAMFOUND signals is equal to an expected SAM to SAM count value (block 415). Where the values are equivalent (block 415), there is no error feedback that is to be provided. As such, the next SAMFOUND signal is awaited (block 405) without applying an error feedback.

Alternatively, where the values are not equivalent (block 415), a feedback error will be generated. The difference is divided by an expected interval between SAMFOUND signals and by the number of clock cycles between two successive SAMFOUND signals (block 420). This division process results in an incremental value to be incrementally accumulated on a per cycle basis as an error feedback signal. It is then determined whether the comparison of the count value between the preceding two SAMFOUND signals is less than or greater than the expected SAM to SAM count value (block 425). Where it is greater (block 425), the multiplication factor used to generate a master clock from a reference clock is increased by the divided result (block 430). The multiplication factor is increased on each clock cycle of the master clock until the next SAMFOUND signal is received (block 435). Once the next SAMFOUND signal is received (block 435), the process of generating another error correction value and incrementally applying it across a given time period is started anew (blocks 410-445). Alternatively, where the received SAM to SAM count value is less (block 425), the multiplication factor used to generate the master clock from the reference clock is decremented by the divided result (block 440). The multiplication factor is decremented on each clock cycle of the master clock until the next SAMFOUND signal is received (block 445). Once the next SAMFOUND signal is received (block 445), the process of generating another error correction value and incrementally applying it across a given time period is started anew (blocks 410-445).

Various embodiments of the present invention provide for applying a frequency adjustment in discrete increments over a programmable interval or in some cases a static interval. This is in contrast to prior art disk lock clock implementations where frequency adjustments are applied all at once. By incrementally applying a portion of a frequency adjustment over a defined time interval, the frequency of the clock synthesizer is constantly being adjusted to not only match the average frequency offset of each wedge interval, but to actually track the frequency profile in a piece wise linear sense. Doing so allows for a much closer frequency matching capability at all times for both servo and data sectors. Further, such an approach mitigates the possibility of adverse transients affecting settling of the clock synthesizer as frequency adjustments are minimally applied over an extended period.

In some embodiments of the present invention, the frequency adjustment applied incrementally over an extended period is predictive. Said another way, the wedge to wedge (e.g., SAM to SAM) total adjustment is made based on what the frequency is expected to be for an upcoming wedge to wedge interval. To facilitate this, a hardware second order frequency error loop, which will adapt not only to a frequency adjustment, but also to the slope of the changing frequency adjustment. This allows for a predictive frequency adjustment to be applied to a ramping accumulator. In some cases, such a second order frequency error loop allows for a reduction in firmware interaction in a disk lock clock control loop.

Figure 5:
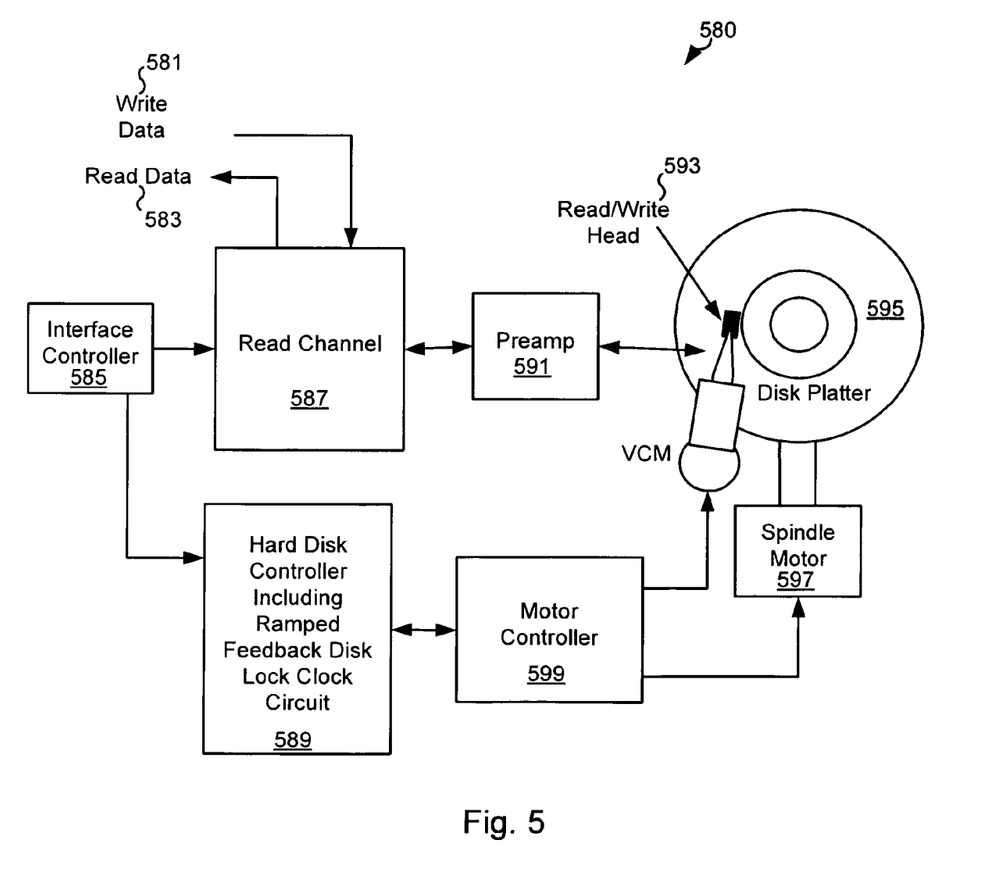
FIG. 5 depicts a storage system including continuous disk lock clock correction in accordance with one or more embodiments of the present invention.

FIG. 5 depicts a storage system 580 including continuous disk lock clock correction in accordance with one or more embodiments of the present invention. Storage system 580 may be, for example, a hard disk drive. Storage system 580 includes a read channel 587. Read channel 587 may be any read channel known in the art. Storage system 580 includes a read channel 587 that may be any read channel known in the art. Read channel 587 receives information from a preamp 591 and provides the received data as read data 583, and provides write data 581 to preamp 591. In addition, storage system 580 includes an interface controller 585, a hard disk controller 589, a motor controller 599, a spindle motor 597, a disk platter 595, and a read/write head 593. Interface controller 585 controls addressing and timing of data to/from disk platter 595. The data on disk platter 595 consists of groups of magnetic signals that may be detected by read/write head assembly 593 when the assembly is properly positioned over disk platter 595. In a typical read operation, read/write head assembly 593 is accurately positioned by motor controller 599 over a desired data track on disk platter 595. Motor controller 599 both positions read/write head assembly 593 in relation to disk platter 595 and drives spindle motor 597 by moving read/write head assembly to the proper data track on disk platter 595 under the direction of hard disk controller 589. Hard disk controller 589 includes a ramped feedback disk lock clock circuit in accordance with various embodiments of the present invention. As an example, hard disk controller 589 may include a ramped feedback disk lock clock circuit similar to that discussed above in relation to FIG. 2A. Spindle motor 597 spins disk platter 595 at a determined spin rate (RPMs).

Once read/write head assembly 593 is positioned adjacent the proper data track, magnetic signals representing data on disk platter 595 are sensed by read/write head assembly 593 as disk platter 595 is rotated by spindle motor 597. The sensed magnetic signals are provided as a continuous, minute analog signal representative of the magnetic data on disk platter 595. This minute analog signal is transferred from read/write head assembly 593 to read channel module 587 via preamp 591. Preamp 591 is operable to amplify the minute analog signals accessed from disk platter 595. In addition, preamp 591 is operable to amplify data from read channel module 587 that is destined to be written to disk platter 595. In turn, read channel module 587 decodes and digitizes the received analog signal to recreate the information originally written to disk platter 595. This data is provided as read data 583 to a receiving circuit. A write operation is substantially the opposite of the preceding read operation with write data 581 being provided to read channel module 587. This data is then encoded and written to disk platter 595.

In conclusion, the invention provides novel systems, devices, methods and arrangements for controlling access to a magnetic storage medium. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for controlling access to a storage medium, the method comprising:
   calculating a point to point error amount;
   generating a incremental error value based at least in part on the point to point error amount; and
   incrementally applying the incremental error value across a defined number of clock cycles, wherein the defined number of clock cycles is greater than one.

2. The method of claim 1, wherein the point to point error amount is a SAM to SAM error amount extending from a first SAMFOUND signal in one sector to a second SAMFOUND signal in a later sector.

3. The method of claim 1, wherein the defined number of clock cycles is approximately equivalent to the number of clock cycles expected between a first SAMFOUND signal and a second SAMFOUND signal.

4. The method of claim 1, wherein the defined number of clock cycles is substantially less than the number of clock cycles expected between a first SAMFOUND signal and a second SAMFOUND signal.

5. The method of claim 1, wherein incrementally applying the incremental error value includes decrementing an accumulated error feedback value by the incremental error value for each of the defined number of clock cycles.

6. The method of claim 1, wherein incrementally applying the incremental error value includes incrementing an accumulated error feedback value by the incremental error value for each of the defined number of clock cycles.

7. The method of claim 1, wherein generating the incremental error value includes dividing an error value derived from the point to point error amount by the defined number of clock cycles.

8. The method of claim 1, wherein generating the incremental error value includes dividing the point to point error amount by an expected point to point error amount to create a percentage error amount, and dividing the percentage error amount by the defined number of clock cycles to create the incremental error value.

9. The method of claim 1, wherein the method further comprises:
   multiplying a reference clock by a variable multiplicand to generate a master clock, wherein the variable multiplicand is varied based at least in part on the incremental application of the incremental error value across a defined number of clock cycles.

10. The method of claim 9, wherein the defined number of clock cycles is a defined number of cycles of the master clock.

11. A ramped disk lock clock feedback circuit, the circuit comprising:
   an error calculation circuit, wherein the error calculation circuit calculates an incremental error value based upon a point to point error amount determined from accessing a storage medium; and
   a smooth feedback application circuit, wherein the smooth feedback application circuit receives the incremental error value and applies the incremental error value a across defined number of clock cycles and provides the result as an error feedback signal, and wherein the defined number of clock cycles is greater than one.

12. The circuit of claim 11, wherein the circuit further includes a SAM to SAM error determination circuit, and wherein the point to point error amount is a SAM to SAM error amount extending from a first SAMFOUND signal in one sector to a second SAMFOUND signal in a later sector determined by the SAM to SAM error determination circuit.

13. The circuit of claim 12, wherein the error calculation circuit includes a divider circuit that divides the SAM to SAM error amount by an expected SAM to SAM period.

14. The circuit of claim 13, wherein the divider circuit is a first divider circuit, wherein the error calculation circuit further includes a second divider circuit, and wherein the second divider circuit divides the result of dividing the SAM to SAM error amount by the expected SAM to SAM period by the defined number of clock cycles.

15. The circuit of claim 11, wherein the smooth feedback application circuit includes an accumulator, and wherein the accumulator increments the error feedback signal by the incremental error value once per cycle for the defined number of clock cycles.

16. The circuit of claim 11, wherein the smooth feedback application circuit includes an accumulator, and wherein the accumulator decrements the error feedback signal by the incremental error value once per cycle for the defined number of clock cycle.

17. The circuit of claim 11, wherein the circuit further comprises:
a multiplier circuit, wherein the multiplier circuit receives a reference clock and the error feedback signal, wherein the multiplier circuit multiplies the reference clock by a variable multiplicand to generate a master clock, and wherein the variable multiplicand is varied based at least in part on the error feedback signal.

18. A storage system, the storage system comprising:
a storage medium, wherein the storage medium includes a number of data bits and moves at a movement rate;
a medium controller, wherein the medium controller generates a master clock correlated to the movement rate, and wherein the medium controller includes:
an error calculation circuit, wherein the error calculation circuit calculates an incremental error value based upon a point to point error amount determined from accessing a storage medium;
a smooth feedback application circuit, wherein the smooth feedback application circuit receives the incremental error value and applies the incremental error value a across defined number of clock cycles and provides the result as an error feedback signal, and wherein the defined number of clock cycles is greater than one; and
a multiplier circuit, wherein the multiplier circuit receives a reference clock and the error feedback signal, wherein the multiplier circuit multiplies the reference clock by a variable multiplicand to generate a master clock, and wherein the variable multiplicand is varied based at least in part on the error feedback signal; and
a data sampling device, wherein the data sampling device samples the data bits at a rate corresponding to the master clock.

19. The system of claim 18, wherein the point to point error amount is a SAM to SAM error amount extending from a first SAMFOUND signal in one sector to a second SAMFOUND signal in a later sector.

20. The system of claim 18, wherein the medium controller further includes:
a SAM to SAM error determination circuit, wherein the point to point error amount is a SAM to SAM error amount extending from a first SAMFOUND signal in one sector to a second SAMFOUND signal in a later sector determined by the SAM to SAM error determination circuit;
wherein the error calculation circuit includes a first divider circuit that divides the SAM to SAM error amount by an expected SAM to SAM period, and a second divider circuit divides the result of dividing the SAM to SAM error amount by the expected SAM to SAM period by the defined number of clock cycles; and
wherein the smooth feedback application circuit includes an accumulator, and wherein the accumulator increments the error feedback signal by the incremental error value once per cycle for the defined number of clock cycles, and wherein the incremental value may be either positive or negative.

21. A method for controlling access to a storage medium, the method comprising:
predicting a point to point error amount for a succeeding wedge;
generating a incremental error value based at least in part on the predicted point to point error amount; and
incrementally applying the incremental error value across a defined number of clock cycles corresponding to the succeeding wedge, wherein the defined number of clock cycles is greater than one.

* * * * *